INVENTOR
SILAS R. HALBERT

BY Hurvitz & Rose
ATTORNEYS

INVENTOR
SILAS R. HALBERT

Hurvitz & Rose
ATTORNEYS

United States Patent Office 3,424,453
Patented Jan. 28, 1969

3,424,453
CARD PICKER MECHANISM

Silas R. Halbert, Palm Bay, Fla., assignor, by mesne assignments, to Mohawk Data Sciences Corp., Herkimer, N.Y.

Filed Aug. 30, 1965, Ser. No. 483,530
U.S. Cl. 271—35 19 Claims
Int. Cl. B65 h 1/06, 3/04

ABSTRACT OF THE DISCLOSURE

A bin for holding a stack of cards in a card picker mechanism having a pair of end walls extending from a baseplate, the endwalls sloping so as to provide three distinct regions: one region, adjacent the baseplate, wherein the end walls are separated by at least the length of a card; a second region above said first region wherein the end walls are separated by a distance less than the length of a flat card but greater than the length of a card bowed under its own weight, the second region being separated from the baseplate by at least the vertical height of a card bowed by its own weight; and a third region, above the second region, in which the end walls are separated by at least the length of a card. Also provided is a gate structure for a card picker mechanism having a baseplate for supporting a stack of cards wherein a recessed surface of the baseplate extends generally under a gate wall and is separated therefrom by a distance sufficient to permit passage of only a single card at a time.

The present invention relates to card picker mechanisms for punch cards and similar sheet-like material, and more particularly, to a picker mechanism for cards and sheet-like material operable at high feed rates and having a high degree of reliability. The present invention is related to my co-pending patent application Ser. No. 316,410, filed Oct. 15, 1963 now U.S. Patent No. 3,252,-702, for "Card Picker Mechanism" and to co-pending patent application Ser. No. 323,025, filed Nov. 12, 1963 now U.S. Patent No. 3,245,681, in the names of Silas R. Halbert and John H. MacNeill for "Improved Card Picker Mechanism," both of said applications being assigned to the same assignee as the present application.

In punch card picking mechanisms, the mechanism is intended to extract the lowermost card from a stack of cards and deliver the single card to further card processing apparatus which may be a card punch or a card reading or sorting mechanism. Limitations on such devices normally result from the rate at which the apparatus can be operated with a high degree of reliability and to the ability of the apparatus to prevent the simultaneous feed of two cards which normally jams the mechanism. In the aforesaid latter co-pending application, the apparatus is described as having the ability to feed cards at extremely rapid rates and thus, the present invention primarily relates to reducing the rate of jamming of the apparatus.

There is no industry standard or specification setting forth acceptable jam rates for either commercial or military applications. Each user must determine how much he is willing to pay to reduce the jam rates and then buy accordingly. At present, one group of relatively inexpensive devices operates at a rate of about one jam in each 2,000 cards fed. The more common devices operate at a rate of about one jam per 12,000 to 15,000 cards fed. One device is available today which jams about once in each 50,000 cards fed.

Applicant's prior devices operated in the range between the latter two equipments discussed above and it is an object of the present invention to improve the apparatus so that its performance exceeds that of any equipment known to applicant at this time while maintaining reasonable costs.

The tendency to jam an apparatus results from two facts, the tendency to feed more than one card and leading edge damage of a single card. In most apparatus, as in the applicant's apparatus, a mechanism is located under the cards for extracting the lowermost card from the stack and delivering it to a further drive means which may be a roller drive, shuttle drive or some other conventional drive mechanism. The card immediately above the lowermost card is in contact with the lowest card and, due to the weight of the stack above these cards, the frictional engagement therebetween is rather considerable. Thus, when the lowest card is moved, the card immediately thereabove tends to move with it. In the prior art devices, as in the present application, a gate is employed to provide an opening through which the cards must be delivered; the opening being less than two card thicknesses. The bottom surface of this throat or gate is the bed on which the lowermost card is seated so that the lowermost card is favored by the gate. However, certain difficulties in preventing two cards from entering the gate are encountered as will be described in more detail subsequently.

A first feature of the present invention is concerned primarily with reducing the frictional force between the two bottommost cards in the stack so that the tendency of the second lowermost card to be driven into the gate is materially reduced. In the prior art devices, the frictional engagement between the two lowermost cards was a function of the number of cards in the stack, i.e., in the hopper. It is apparent that if the hopper is completely loaded, and it may have several hundred cards therein, the frictional force between the two lowermost cards is great; whereas when the number of cards in the hopper is smaller, this frictional force is decreased considerably. This variation in frictional force has greatly complicated the problem of reducing the tendency of the apparatus to feed two cards.

In accordance with a first feature of the present invention, the load or weight on the lowermost cards of the stack is maintained substantially constant regardless of the number of cards in the hopper. This effect is achieved by supporting the cards in the hopper in such a manner that only a relatively small number of the cards are actually supported directly by the cards in the bottom of the hopper. The remaining cards in the stack are primarily supported by the sides of the hopper and are dropped into the lower or bottom region of the stack as cards are fed out.

The second difficulty with the prior art picker mechanisms results, as indicated above, from the inability of the gate to prevent two cards from entering the gate simultaneously. Theoretically, the height of the gate opening could be made exactly equal to the height of the card. The conventional card is .007" thick and therefore the gate opening theoretically should be .007". This approach is acceptable so long as one is feeding new cards only. However, where old cards must be processed, the gate thickness cannot be equal to the thickness of the card since, in use, the leading edges of the cards become somewhat blunted or burred and the leading edge thickness of the card may exceed its normal thickness by a factor of as much as 75 percent. Thus, the gate opening must be greater than the nominal thickness of the card. It has been found that, in order to accommodate damaged cards, the gate thickness should be about .012". Thus, the margin of safety is only .002" and if the leading edge of the second lowest card is inclined toward the bottom of the hopper due to bowing of the card, the inclined leading edge of the second card may enter the gate and as its full thickness begins to enter the gate, a jam occurs.

In accordance with the latter of the aforesaid applications, an attempt was made to eliminate this difficulty by blowing a stream of air at an angle at the leading edge of the lowermost card as it approached the gate. If the mechanism were tending to deliver two cards, the air jet would tend to force its way between the two cards, pushing the lowermost card against the bottom surface to insure its passage through the gate and raising the leading edge of the next card so that it hit the front surface of the gate and was held there until the lowermost card was delivered. In order to further enhance the effect of the top stream of air, a vacuum was developed under the lowermost card immedaitely adjacent the gate to insure that the stream of air did not lift the lowest card from the base plate. Further, the vacuum increased the rate at which the second card, now the lowest card, was returned to the base plate after the prior lowest card was delivered.

As indicated above, one of the major reasons for jamming results from bowing of the cards. Thus, if a card which is the second card in the stack has an inherent downward bow, either due to the manufacturing or prior handling or some other reason such as dampness and drying, and the picker attempts to feed two cards at once, the leading edge of the second card can pass under the gate. This cause of jams is basically a random function of the number of bowed cards, over which there is no control, but it is also an inverse function of the weight of cards on the bottom card in the stack. In accordance with the first feature of the present invention, the weight on the lowest card is maintained at a relatively constant low value at all times, so that the probability of a jam occurring when two cards are fed and the second card is bowed is increased over the prior systems. However, the tendency to feed two cards is so greatly reduced in accordance with the first feature of the invention that the performance of an apparatus employing only the first feature is better than applicant's prior apparatus. On the other hand, although the first feature of the invention does increase the reliability of the picker mechanism, the increase in reliability is not as great as one would initially expect.

The difficulty relating to the increased effect of bow of a card, resulting from utilization of the first feature of the present invention, is overcome by the second feature of the invention so that, when the two features are employed together, the apparatus has been found so reliable that in all tests to date of filing of this application, which has involved the processing of well over 100,000 cards, not a single jam has been detected due to two cards entering the gate at the same time. The second feature of the invention relates to undercutting the bottom plate of the picker mechanism on which the cards lie immediately adjacent the gate mechanism. The undercut may be of the order of a card thickness; that is, .007". With vacuum being delivered under the card, the leading portion of the lowermost card, as it approaches the gate, is deflected downwardly at such an angle that it has been found in all instances to either be completely withdrawn from the leading surface of a second card or it is deflected downwardly sufficiently that the contact between the leading edge of the second card cannot maintain sufficiently tight contact against the surface of the lowermost card to prevent the air streams aimed at the leading edge from separating the two cards.

It is an object of the present invention to provide a card picker mechanism in which the weight of the cards on a bottom plate of the picker is maintained relatively constant.

It is another object of the present invention to provide a picker mechanism for punch cards and like-shaped material in which the frictional force existing between the two lowermost cards of the stack never exceeds a specified maximum which is calculated to maintain the drag on the second card due to movement of the lower card within specified limits.

Still another object of the present invention is to provide a picker mechanism for punch cards and like sheet material having a gate structure which positively separates two cards being delivered concurrently, from one another so that the lowermost card may pass through the gate and the uppermost card is blocked.

Yet another object of the present invention is to provide a picker mechanism with an undercut base plate adjacent the gate and a vacuum drawn through the bottom plate so that the card to be delivered is deflected downwardly to pass through the gate mechanism and thus positively separate the lowermost card from the second card in the stack.

It is still another object of the present invention to provide a picker mechanism for punch cards and like sheet material wherein the weight of the stack on the base plate of the picker mechanism is maintained generally constant so as to reduce the tendency of the mechanism to deliver two cards concurrently and wherein a gate mechanism is employed which tends to positively separate the lowermost card from the second card in the event that the mechanism does tend to deliver two cards concurrently.

The above and still further objects, features and advantages of the present invention will become apparent upon consideration of the following detailed description of one specific embodiment thereof, especially when taken in conjunction with the accompanying drawings, wherein.

Figure 1:
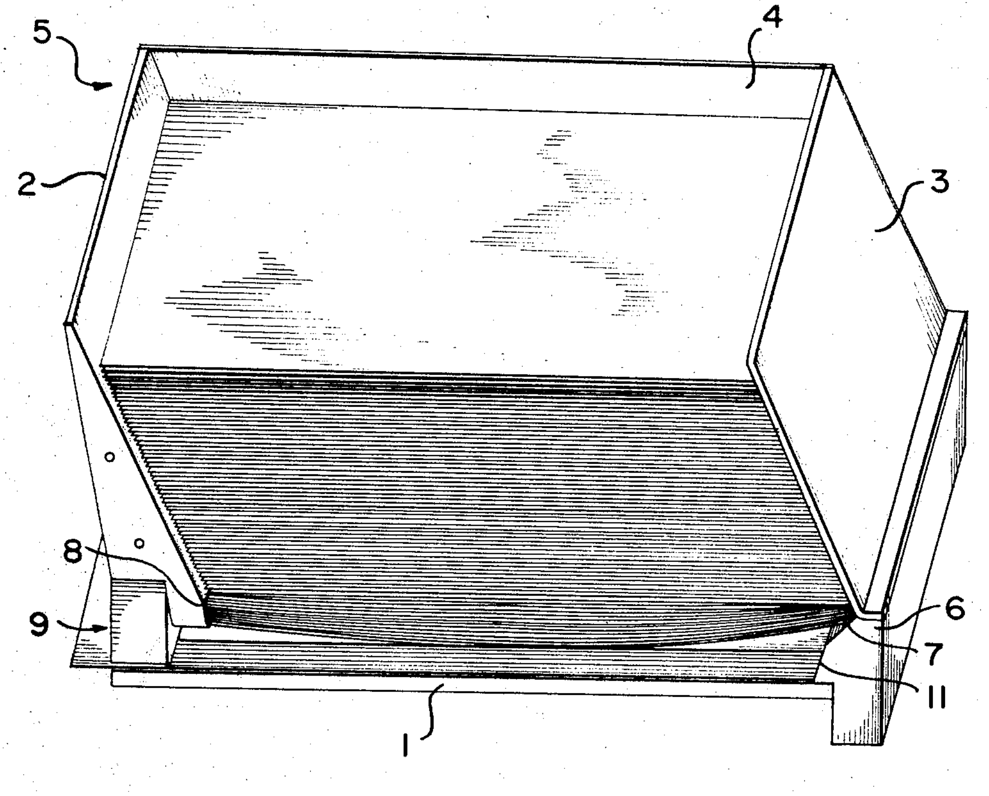
FIGURE 1 is a front view in elevation of the structure of the hopper employed in the present invention.
Figure 2:
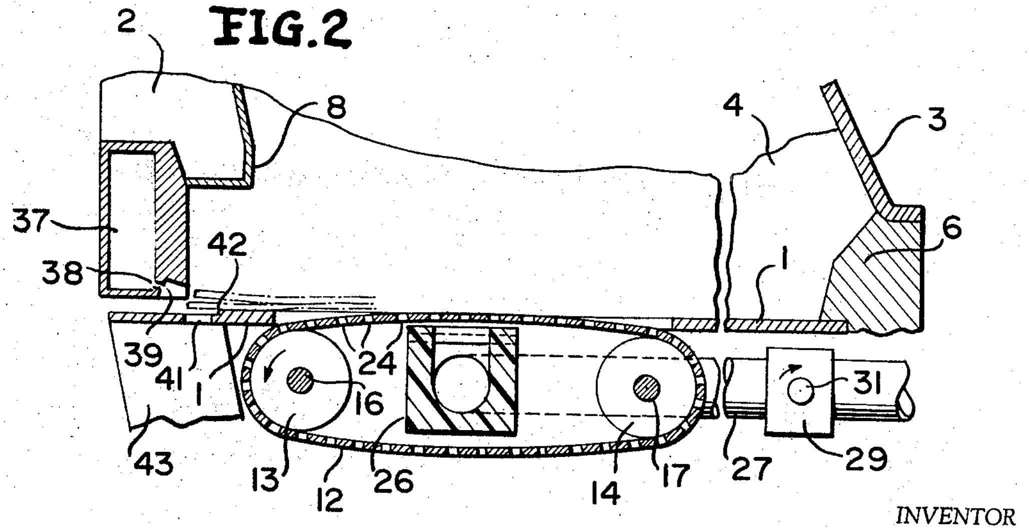
FIGURE 2 is a side view of the picker mechanism and illustrates the modified gate structure of the invention.

Referring now specifically to FIGURES 1 and 2 of the accompanying drawings, there is illustrated a bin or card stack holder 5 for delivering cards to a picker mechanism associated with a base member 1. The base member 1 is important relative to FIGURE 1 only in that it is an object of the invention to limit the load or weight of cards on the base member to a predetermined small value.

The card bin 5 includes the base plate 1, already indicated, and a pair of sidewalls 2 and 3, respectively. The bin is also supplied with a backwall 4. In an apparatus of this type, the mechanism, although indicated as vertical, normally makes about a 15° angle with the horizontal so that the major weight of the cards is carried on the backwall 4.

Considering now the important features of the first feature of the invention, the inner surfaces of the walls 2 and 3, as illustrated in FIGURE 1, slope from their upper end towards the right so that, as the cards fall through the stack, they are shifted from left to right. The spacing between the walls 2 and 3 is sufficient for the cards to have a free fit between the walls; that is, they may lie flat and fall freely through the stack without any appreciable pressure at their ends due to the spacing between the two end walls.

The lower end of the wall 3 terminates in a support member 6 having a surface or end wall 7 which slopes sharply from the right to the left, towards the base plate 1. Thus, the end wall 7 has a downward slope which is oppositely directed from the downward slope of the inner surface of the wall 3. In the corresponding region of the wall 2, the slope of the wall changes to provide a surface or end wall 8 having a downward slope to the right which is not as sharp as the downward slope to the right of the wall immediately thereabove.

The changes in slope discussed immediately above provide two sloping surfaces which converge and which provide a spacing between the surfaces; that is, between the end walls 7 and 8, which is less than the length of the cards. However, the spacing between these two end walls is greater than the length of the cards when bowed due to their own weight. More particularly, if a card is supported at both ends, but is unsupported in the middle, the card will have a natural bow as determined by its own properties, mainly stiffness, which natural bow will shorten the length of the card in a given plane by a predetermined distance. Also, the distance of the base plate 1 below the end walls 7 and 8 is such that, if no cards are located on the base plate, the cards in the stack between walls 2 and 3, hereinafter referred to as the primary stack, may bow sufficiently to drop onto the base plate. As the stack of cards on the base plate 1 (hereinafter referred to as the secondary stack) builds up, however, a sufficient number of cards accumulates to contact the bowed portion of the lower cards in the primary stack and prevent complete bowing of these cards. Thus, the bowing of the bottommost cards in the primary stack is not sufficient to permit the length of the cards to become less than the distance between the end walls 7 and 8. In consequence, the number of cards resting directly on the base plate 1 is limited and the major weight of the cards in the primary stack is carried at all times by the wall 4 and the members which define the end walls 7 and 8. In this manner, the maximum weight which can be experienced by the lowermost card is limited to an amount which is considerably less than would be present if the full weight of the stack were directly applied to the base 1.

It will be noted that the bottom of the end wall 8 terminates in a plane above the plane of the bottom or lower part of the end wall 7. The reason for this is that when a card does drop toward the base plate 1, it is moved under the wall 2 and toward a gate 9. The end wall 7 terminates in a further surface 11, which although not as sharply inclined toward the left as the wall 7, is also inclined toward the left. The surface 11 thus also tends to move the cards in the secondary stack toward the left as they drop toward the base plate 1. The reason for the initial shift of the cards to the right and the subsequent shift to the left is so the edges of the cards adjacent the gate 9 extend under the wall 2, which thus serves as a gate wall, and into a region where they are not directly subjected to any weight from the primary stack. Thus, the riffling air, which is normally supplied to suck stacks, is quite effective in maintaining the edges of the cards adjacent the gate 9 in a relatively loose array.

The apparatus described immediately above has been found quite effective in producing a material reduction in the weight of the stack on the base plate and thus, in the clamping force between the two bottommost cards. It has been found that even with a full hopper, the total weight on the base plate is limited to a few ounces.

As previously indicated, the apparatus of FIGURE 1 is effective to perform its intended function regardless of the type of picker mechanism employed, including the gate structure to be employed with the transport mechanism. However, as indicated above, although the apparatus of FIGURE 1 provides a large overall improvement in the operation of picker mechanisms in general, it does introduce a problem which prevents the apparatus from realizing its full potential. This problem arises from the fact that some cards tend to have a convex upward bow; that is, a bow which is the reverse of the bow illustrated in FIGURE 1 of the bottom of the primary stack. As a result, with relatively little weight on the cards in the secondary stack, it being a specific object of the stack mechanism illustrated to minimize this weight, the bowed cards are more likely to pass into the gate and produce a jam than when the prior art devices have large numbers of cards in the hopper and the bottom cards are heavily loaded. It must be remembered, however, that the mechanism of the present invention is far less likely to deliver two cards to the throat than the prior art devices so that the overall tendency to jam is greatly diminished because of the lesser number of double feeds.

Figures 3, 4:
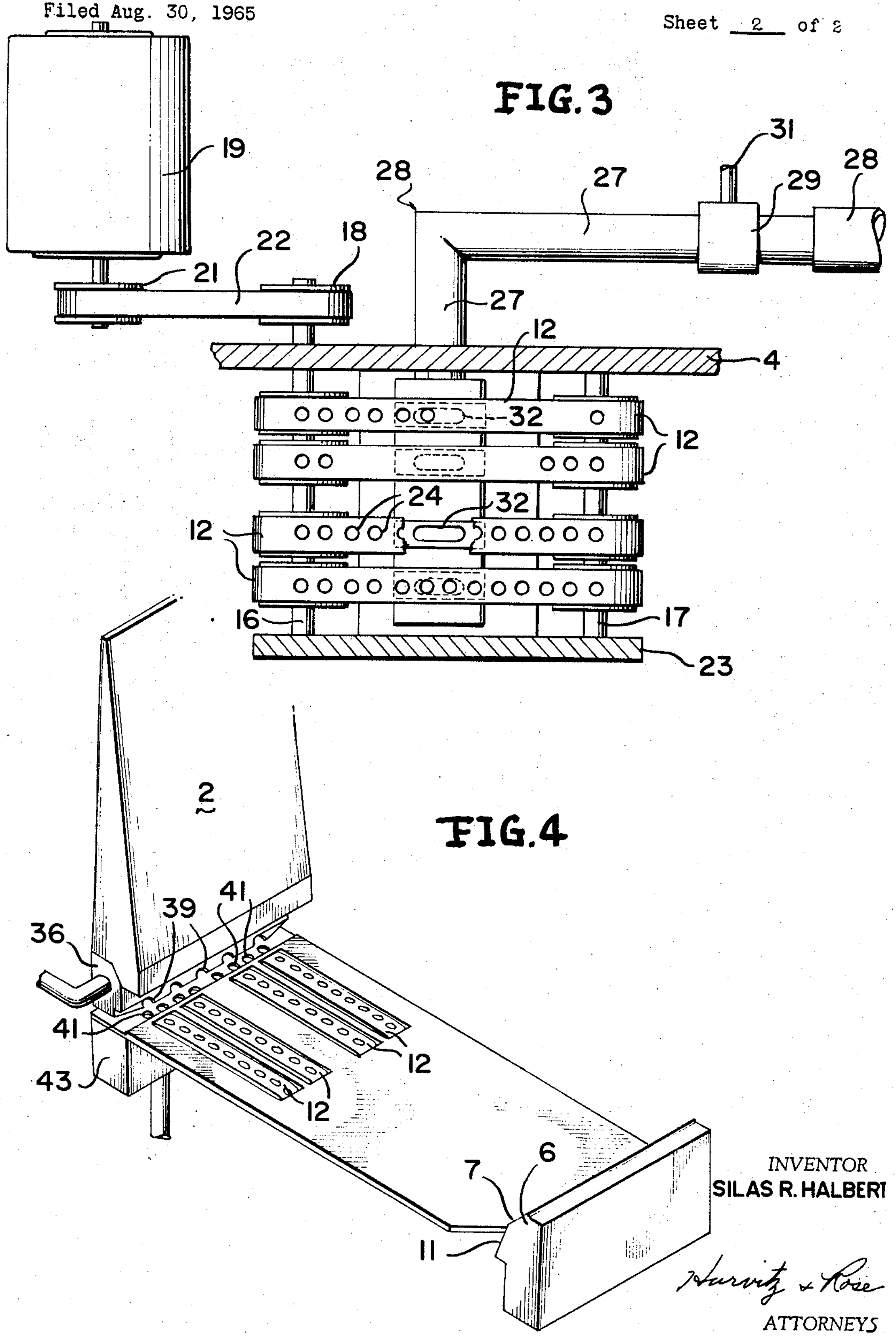
FIGURE 3 is a top view of the picker mechanism employed with the present invention.
FIGURE 4 is a perspective view in elevation illustrating the hopper, picker and gate structure.

In accordance with a second feature of the present invention, the aforesaid difficulty with bowed cards is almost completely eliminated. Referring specifically to FIGURES 2–4 of the accompanying drawings, there is illustrated a picker mechanism to be employed with the stacking arrangement of FIGURE 1 and incorporating an improvement over the picker mechanism described in the latter co-pending application. The picker mechanism illustrated in FIGURES 2–4 is identical in all respects with the mechanism of the latter of the aforesaid applications except for a modification in the throat area to be described subsequently.

The picker mechanism comprises four endless flexible belts 12, each supported between a pair of rollers 13 and 14. The rollers 13 and 14 are each carried on shafts 16 and 17, respectively, with the shaft 17 being connected to a further wheel or roller 18 driven by a constant speed electric motor 19, via a further pulley 21 and a belt 22. The shaft 16 is journaled in a front wall of picker mechanism 23 and passes through the backwall 4 of the stack frame. The shaft 17 extends between and is journaled in the walls 4 and 23.

The belts are constantly moving and normally are positioned below the upper surface of the base plate 1 in slots formed in the base plate. Four belts are illustrated and thus, there are four slots formed in the plate. The belts are provided with a plurality of holes 24 so that vacuum or low pressure may be transmitted through the belts to the lowest card. The holes 24 in the belts are positioned under the web portions of the cards and thus, positive delivery of the vacuum to the underside of the lowest card is assured without appreciable transmission of the vacuum to the card immediately thereabove.

The vacuum which is to be supplied to the lowest card to clamp it to the belts is supplied through a block 26 carried on the end of a pipe 27. The pipe 27 has a right angle bend 28 so that a second section of the pipe 27 lies parallel to the axis of the belts 12. The arm 27 is hollow and is connected through a flexible coupling 28 to a source of low pressure, or more conventionally, vacuum. The pipe is physically supported in a member 29 carried on a shaft 31. The shaft 31 is mounted for oscillation about its axis by conventional means. The pipe 27, as previously indicated, carries the block 26 thereon, the block being disposed between the two lengths of the belts 12. In its normal or unactuated position, the block 26 does not contact the belts, and the belts due to their positioning do not extend above the upper surface of the base plate 1. Also, due to the air space between the block and belts, no vacuum is transmitted to the lowest card.

Upon rotation of the shaft 31, the block 26 is rotated clockwise about the axis of the shaft 31, pushes against the belts and moves them above the upper surface of the base plate 1 and into contact with the bottom surface of the lowest card. The vacuum or low pressure developed in the pipe 27 and delivered to the interior of the block 26 communicates with the undersides of the belts 12 and therefore with the card through the holes 24, by means of slots 32 formed in the upper surface of the block 26 immediately adjacent the belts 12. Thus, when the block 26 is moved into contact with the belts, the vacuum clamps the lowest card to the belts. Thus, positive engagement between the belts and the card is effected and the card is moved to the left as illustrated in both FIGURES 1 and 2. Riffling air for the secondary stack is delivered through slots 33 formed in the wall 4 and in the wall 23.

It is important to note, and reference is made to FIGURE 4 of the accompanying drawing, that the major portion of the belts 12 lies to the left of the point of contact between the primary and secondary stacks. Thus, even though there is some variation in weight on the secondary stack with height of the primary stack, the variation in weight has little effect on friction between the two lowest cards in the region in which the belts are effective.

Upon actuation of the mechanism; that is, upon clockwise rotation of the shaft 31, the lowest card in the secondary stack is moved to the left as viewed in FIGURE 1 and approaches a gate structure generally designated by the reference numeral 34. The structure 34 comprises a hollow block 36 having pressurized air delivered to its interior generally designated by the reference numeral 37. A plurality of ports 38 are formed so as to produce communication between the chamber 37 and a plurality of slots 39 formed in the right lower corner of the block 36. The reason that the pressurized air is delivered into the slots 39 rather than directly through the slot 38 to the front surface of the block is to prevent the cards from blocking the ports. The ports 38 are aimed almost directly at the leading edges of the cards so as to be most effective in separating these edges of the cards. Ports 41 are formed in the base plate 1 and are connected to a vacuum chamber 43 for purposes to be described subsequently.

It wil be noted that, in accordance with the present invention, the base plate 1 is recessed as designated by the reference numeral 42 so the upper surface of the base plate 1 has a downward step formed adjacent the gate 34. For purposes of explanation only, the downward step may be .007″. A further important dimension of the apparatus in this region is the spacing between the block 36 and the base plate 1. This spacing may be nominally .012″ so that the lower card must be deflected downwardly at least .002″ to pass under the block 36.

In operation, when a card is moved to the left, towards the gate 34, the leading edge of the card passes over the step or notch 42 and the vacuum delivered through ports 41 located just to the left of the notch 42 draws the card down against the upper surface of the plate as viewed in FIGURE 2 so that the card is deflected downwardly and passes under the block 36. The pressurized air delivered through the passages 38 and the slots 39 is directed at the leading edges of the cards in the region where the lower card is being deflected downwardly. As a result, separation of the lower card from the upper card is readily effected with the second card being deflected upwardly and striking the face of the right surface of the block 36.

This feature of the invention is effective both with flat and bowed cards. If the second card in a stack is perfectly flat then the downward bow of the lower card produces an immediate separation of the cards so that the air passing through the passages 38 effects a positive separation. If the second card, however, is bowed downwardly in this region, the downward deflection of the lower card to the left of the notch 42 prevents a tight seal between the leading edge of the second card and the immediately adjacent surface of the lower card so that again the pressurized air passing through the passage 38 may effect positive separation of the cards.

The specific dimensions set forth above for undercut and gate spacing is an example of one device found to operate satisfactorily. Another arrangement employed an undercut of .014″ and a gate opening of .014″. In such an arrangement, the bottom card must be deflected .007″, requiring a larger vacuum than in the prior example. The advantage to the latter arrangement is the ability to handle cards with badly burred leading edges since the gate accepts twice the nominal thickness of the card.

While I have described and illustrated one specific embodiment of my invention, it will be clear that variation of the details of construction which are specifically illustrated and described may be resorted to without departing from the true spirit and scope of the invention as defined in the appended claims.

I claim:

1. In a card picker mechanism for picking cards having a predetermined size, a predetermined shape, and a predetermined flexibility, a bin for holding a stack of cards to be picked, said bin having a pair of end walls having a decreasing spacing therebetween, the minimum spacing between said pair of end walls being less than the length of a card when flat and greater than the length of a card bowed under its own weight, a bottom plate spaced a distance below the lower ends of said pair of end walls greater than the vertical height of the bow of a card under its own weight, means located at opposite ends of said bottom plate for defining a region having a length at least equal to the length of the cards to be picked and means for retaining a stack of cards above said pair of end walls.

2. In a card picker mechanism for picking cards having a predetermined size, a predetermined shape, and a predetermined flexibility, a bin for holding a stack of cards to be picked, said bin having a pair of end walls and a base plate, an upper portion of said end walls being of decreasing spacing to define a region having a length less than the length of a card when flat and at least equal to the length of a card bowed under its own weight and a lower portion of said end walls providing a lower region terminating in said base plate of a length at least equal to the length of the cards, and means for retaining a stack of cards above said end walls.

3. In a card picker mechanism for picking cards having a predetermined size, a predetermined shape, and a predetermined flexibility, a bin for cards to be stacked comprising a pair of end walls and a base plate, said end walls being spaced relative to one another so as to provide a lower region terminating in said base plate and of a length at least equal to the length of cards to be placed in said bins, an intermediate region having a length less than the length of a card when flat and at least equal to the length of a card when bowed under its own weight, and an upper region of a length at least equal to the length of the cards, said base plate being spaced below said intermediate region by a distance greater than the vertical height of the bow of a card under its own weight.

4. In a card picker mechanism for picking cards having a predetermined size, a predetermined shape, and a predetermined flexibility, a bin for holding a stack of cards to be picked, said bin having a pair of end walls, one of said pair of end walls sloping towards the other of said pair of end walls so as to provide a minimum spacing therebetween less than the length of a card when flat and at least equal to the length of a card when bowed under the weight of the cards, said one of said pairs of end walls terminating below the other of said pair of end walls, and a base plate disposed below said pair of end walls by a distance greater than the vertical height of the bow of a card under the weight of the cards.

5. The combination according to claim 4 further comprising a gate structure disposed under said other of said pair of end walls and at a distance from the lower end of said one of said pair of end walls which is greater than said other of said pair of end walls.

6. The combination according to claim 5 further comprising a further end wall extending downward from the lower end of said one of said pair of end walls to said base plate and towards said gate structure, said gate structure being spaced from the lower end of said further end wall by a distance greater than the length of a card.

7. The combination according to claim 6 wherein said gate structure comprises a gate wall disposed above said base plate, said base plate having a recessed surface extending under said gate wall and to a location between said gate wall and said further end wall.

8. The combination according to claim 7 wherein the spacing between said gate wall and said recessed surface lies in a range of the thickness of one and two cards to be picked by said mechanism.

9. The combination according to claim 7 further comprising means for directing a stream of air generally toward said base plate at said location.

10. The combination according to claim 9 further comprising means adjacent said location for relieving air pressure between said base plate and the lowest card adjacent the location.

11. The combination according to claim 9 further comprising a plurality of apertures formed in said recessed surface adjacent said location to relieve air pressure along said base plate adjacent said location.

12. In a card picker mechanism for picking cards having a predetermined size, a predetermined shape, and a predetermined flexibility, a gate structure comprising a base plate supporting cards to be picked, and a gate wall spaced from and disposed generally parallel to said base plate adjacent one end thereof, said base plate having a recessed surface extending under said wall to a predetermined location at a distance from said wall which is small compared to the length of the cards to be picked.

13. In a card picker mechanism for picking cards having a predetermined size, a predetermined shape, and a predetermined flexibility, a gate structure comprising a base plate for supporting cards to be picked, and a gate wall spaced from and disposed generally parallel to said base plate adjacent one end thereof, said base plate having a recessed surface extending under said wall and to a predetermined location recessed from said wall by a distance which is small compared to the length of the cards to be picked, and means for directing a stream of air generally toward said location from the region of said gate wall.

14. The combination according to claim 13 wherein said means comprises a source of air under pressure disposed adjacent a surface of said gate wall remote from said base plate, and air passage means communicating with said source and generally directed toward said location.

15. The combination according to claim 13 further comprising means for releasing air pressure along said base plate generally at said location.

16. The combination according to claim 13 wherein the distance between said gate wall and said recessed surface is greater than the thickness of a single card to be picked but less than twice said thickness.

17. In a card picker mechanism, a method of holding cards to be picked comprising:

supporting a primary stack of cards at opposite ends of the lowermost card of said primary stack so as to permit said lowermost card to bow;

supporting a secondary stack of cards on a baseplate from which the lowermost card of said secondary stack is to be picked and which is located substantially below said secondary stack;

causing the lowermost card of the primary stack to be dropped to the top of the secondary stack whenever such card is bowed at least a predetermined amount; and controlling the amount of bowing of the lowermost card in the primary stack as a function of the number of cards in the secondary stack.

18. The method according to claim 17 wherein said predetermined amount of bowing is that amount resulting from the weight of the bowed card.

19. The method according to claim 18 wherein controlling the amount of bowing includes further supporting the lowermost card in the primary stack with the secondary stack.

References Cited

UNITED STATES PATENTS

| | | | |
|---|---|---|---|
| 2,806,696 | 9/1957 | Bishop | 271—44 X |
| 3,285,602 | 11/1966 | Hartel | 271—32 |

M. HENSON WOOD, Jr., *Primary Examiner.*

R. A. SCHACHER, *Assistant Examiner.*

U.S. Cl. X.R.

271—61